United States Patent
Baskin

(10) Patent No.: US 11,643,195 B2
(45) Date of Patent: May 9, 2023

(54) LOW-DRAG BLADE TIP

(71) Applicant: Bell Textron Inc., Fort Worth, TX (US)

(72) Inventor: Bryan Kenneth Baskin, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 177 days.

(21) Appl. No.: 16/878,045

(22) Filed: May 19, 2020

(65) Prior Publication Data

US 2021/0362845 A1   Nov. 25, 2021

(51) Int. Cl.
| | |
|---|---|
| *B64C 27/46* | (2006.01) |
| *B64C 29/00* | (2006.01) |
| *B64C 27/50* | (2006.01) |

(52) U.S. Cl.
CPC .......... *B64C 27/463* (2013.01); *B64C 27/50* (2013.01); *B64C 29/0033* (2013.01)

(58) Field of Classification Search
CPC ....... B64C 27/463; B64C 21/00; B64C 27/50; B64C 29/0033; B64C 2230/28; B64C 11/16; B64C 11/28
See application file for complete search history.

(56) References Cited

U.S. PATENT DOCUMENTS

| | | | |
|---|---|---|---|
| 3,592,412 A * | 7/1971 | Glatfelter | B64C 29/0033 416/142 |
| 6,659,722 B2 | 12/2003 | Sehgal et al. | |
| 10,315,760 B2 * | 6/2019 | Bevirt | B64C 27/28 |
| 2010/0181432 A1 * | 7/2010 | Gratzer | B64C 11/18 244/199.4 |
| 2013/0026305 A1 * | 1/2013 | Wang | B64C 29/0033 244/7 R |
| 2015/0274290 A1 | 10/2015 | Fenny et al. | |
| 2016/0347441 A1 * | 12/2016 | Wainfan | B64C 11/28 |
| 2017/0144746 A1 * | 5/2017 | Schank | B64C 29/0033 |
| 2017/0284371 A1 * | 10/2017 | Gamble | B64C 27/52 |
| 2018/0065741 A1 * | 3/2018 | Vondrell | B64C 27/08 |
| 2018/0304997 A1 * | 10/2018 | Dhandhania | B64C 23/065 |
| 2019/0248472 A1 * | 8/2019 | Zipszer | B64C 27/473 |
| 2020/0079500 A1 * | 3/2020 | Bevirt | B64D 27/24 |
| 2021/0078695 A1 * | 3/2021 | Foskey | B64C 11/28 |
| 2021/0078698 A1 * | 3/2021 | Liu | B64C 27/463 |
| 2021/0206485 A1 * | 7/2021 | Bevirt | B64C 7/02 |

\* cited by examiner

*Primary Examiner* — Joshua J Michener
*Assistant Examiner* — Cindi M Curry
(74) *Attorney, Agent, or Firm* — Fogarty LLP

(57) ABSTRACT

Embodiments are directed to a rotor blade comprising a blade tip attached to the outboard end of the rotor blade. The blade tip has at least two sides that are tapered together to an edge. The length of the blade tip extending away from the outboard end to the edge is a distance that is greater than half the thickness of the outboard end. When the rotor blade is operating in a folded configuration, air flows over the sides in a direction generally parallel to a longitudinal axis of the rotor blade. The sides have profiles that minimize or prevent separation of the air flow from the blade tip.

15 Claims, 7 Drawing Sheets

LOW-DRAG BLADE TIP

BACKGROUND

Fixed-wing aircraft, such as airplanes, are capable of flight using wings that generate lift in response to the forward airspeed of the aircraft. The forward airspeed is generated by thrust from one or more jet engines or propellers. The wings generally have an airfoil cross section that deflects air downward as the aircraft moves forward, generating the lift force to support the aircraft in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering and landing vertically. One example of a VTOL aircraft is a helicopter, which is a rotorcraft having one or more rotors that provide lift and thrust to the aircraft. The rotors not only enable hovering and vertical takeoff and landing, but also enable forward, backward and lateral flight. These attributes make helicopters highly versatile for use in congested, isolated or remote areas. Helicopters, however, typically lack the forward airspeed of fixed-wing aircraft due to the phenomena of retreating blade stall and advancing blade compression.

Tiltrotor aircraft attempt to overcome this drawback by including a set of rotors that can change their plane of rotation based on the operation being performed. Tiltrotor aircraft generate lift and propulsion using rotors that are typically coupled to nacelles mounted near the ends of a fixed wing. The nacelles rotate relative to the fixed wing such that the rotors have a generally horizontal plane of rotation for vertical takeoff, hovering and landing and a generally vertical plane of rotation while cruising in forward flight, wherein the fixed wing provides lift and the rotors provide forward thrust. In this manner, tiltrotor aircraft combine the vertical lift capability of a helicopter with the speed and range of fixed-wing aircraft.

Tiltrotor aircraft are hybrids between traditional helicopters and traditional propeller driven aircraft. During airplane mode of the tiltrotor, forward speed and range is limited by certain fundamental limitations of the rotor systems.

SUMMARY

Traditionally, rotor blade tips are optimized for simplicity of manufacturing or for low drag in rotating operation. However, for tiltrotor aircraft that can fold rotor blades when operating in a jet mode, the rotor blades may spend a majority of flight time in a stowed configuration. In this configuration, neither of the typical blade tip options is ideal because the blades are not fully faired into the airframe, which leaves the blade tips exposed so that they are a drag and vortex source. Embodiments of the invention provide blade tips having shapes minimize drag in the stowed-blade jet mode.

In one embodiment, a rotor blade comprises a blade span extending between a hub end and a tip end, wherein the blade span has a thickness at the tip end. A blade tip is attached to the tip end of the blade span, the blade tip having at least two sides that are tapered together to an edge, wherein a length of the blade tip from the tip end to the edge is a distance that is greater than half the thickness of the tip end. In one example, the length of the blade tip is a distance that is at least equal to the thickness of the tip end. The blade tip has a first side corresponding to a first side of the blade span, and a second side corresponding to the second side of the blade span. In various embodiments, the first and second sides of the blade tip many have convex profiles, or the sides of the blade tip may have convex profiles near the tip end that transition into flat profiles near the edge, or the sides of the blade tip may have convex profiles near the tip end that transition into concave profiles near the edge. The edge may be offset from a centerline of the blade span. The first and second sides have profiles that maintain laminar air flow from the tip end to the edge. When the rotor blade is operating in a folded configuration, air flows over the first and second sides in a direction generally parallel to a longitudinal axis of the rotor blade, and the first and second sides have profiles that minimize or prevent separation of the air flow from the blade tip.

A tiltrotor aircraft may comprise a rotor system having at least one rotor blade having an outboard end. A blade tip is attached to the outboard end of the rotor blade. The blade tip has at least two sides that are tapered together to an edge. The length of the blade tip from the outboard end to the edge is a distance that is greater than half the thickness of the outboard end. The length of the blade tip may be a distance that is at least equal to the thickness of the outboard end, for example. The blade tip has a first side corresponding to a first side of the rotor blade, and a second side corresponding to the second side of the rotor blade. The first and second sides of the blade tip may have convex profiles or convex profiles near the outboard end that transition into flat profiles near the edge or convex profiles near the outboard end that transition into concave profiles near the edge. The edge may offset from a centerline of the rotor blade. The first and second sides have profiles that maintain laminar air flow from the outboard end to the edge. When the rotor blade is operating in a folded configuration, air flows over the first and second sides in a direction generally parallel to a longitudinal axis of the rotor blade, and the first and second sides have profiles that minimize or prevent separation of the air flow from the blade tip.

In another embodiment, a tiltrotor aircraft comprises a fuselage, a wing attached to the fuselage, and a rotor system coupled to the wing and configured to move between a horizontal position and a vertical position during operation, the rotor system comprising two or more rotor blades operable to generate thrust when rotating and configured to move between an extended position and folded position. Blade tips are attached to an outboard end of the rotor blades. The blade tips have two sides that taper together to an edge, wherein a length of the blade tip from the outboard end to the edge is a distance that is greater than half the thickness of the outboard end. The rotor blades may operate in a folded position so that air flows over the first and second sides in a direction generally parallel to a longitudinal axis of each rotor blade, and so that the first and second sides have profiles that minimize or prevent separation of the air flow from the blade tip.

BRIEF DESCRIPTION OF THE DRAWINGS

Figure 1A:
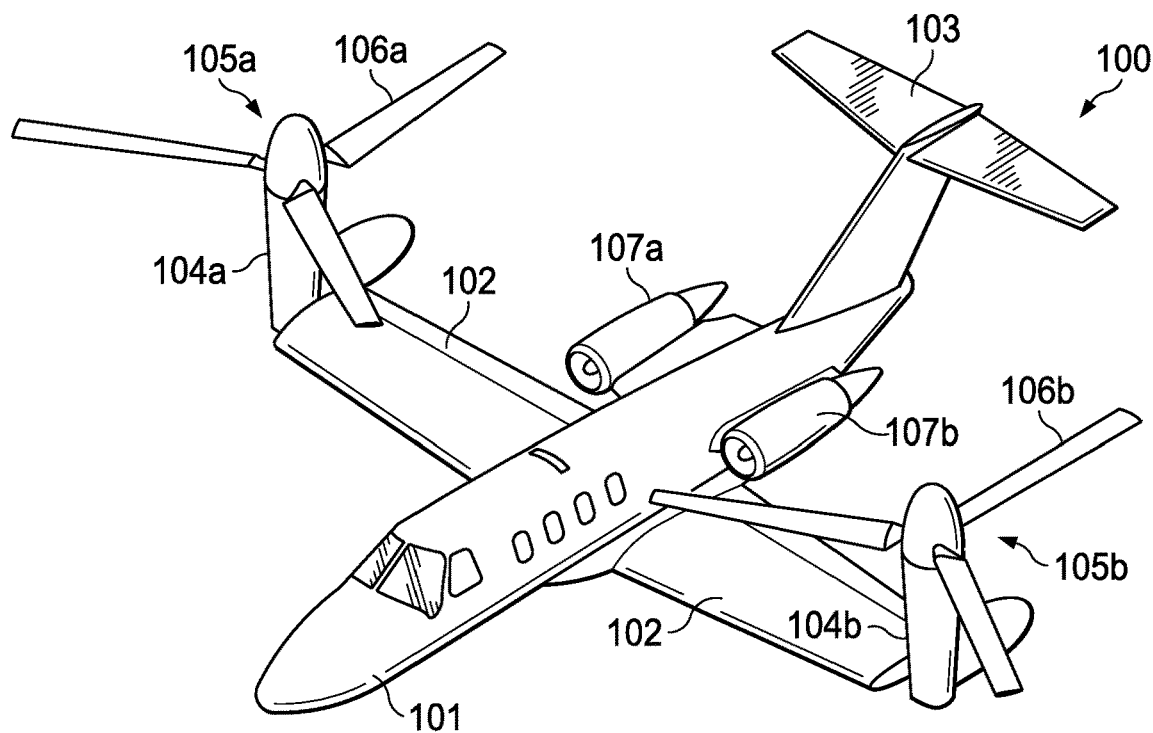
Figure 1B:
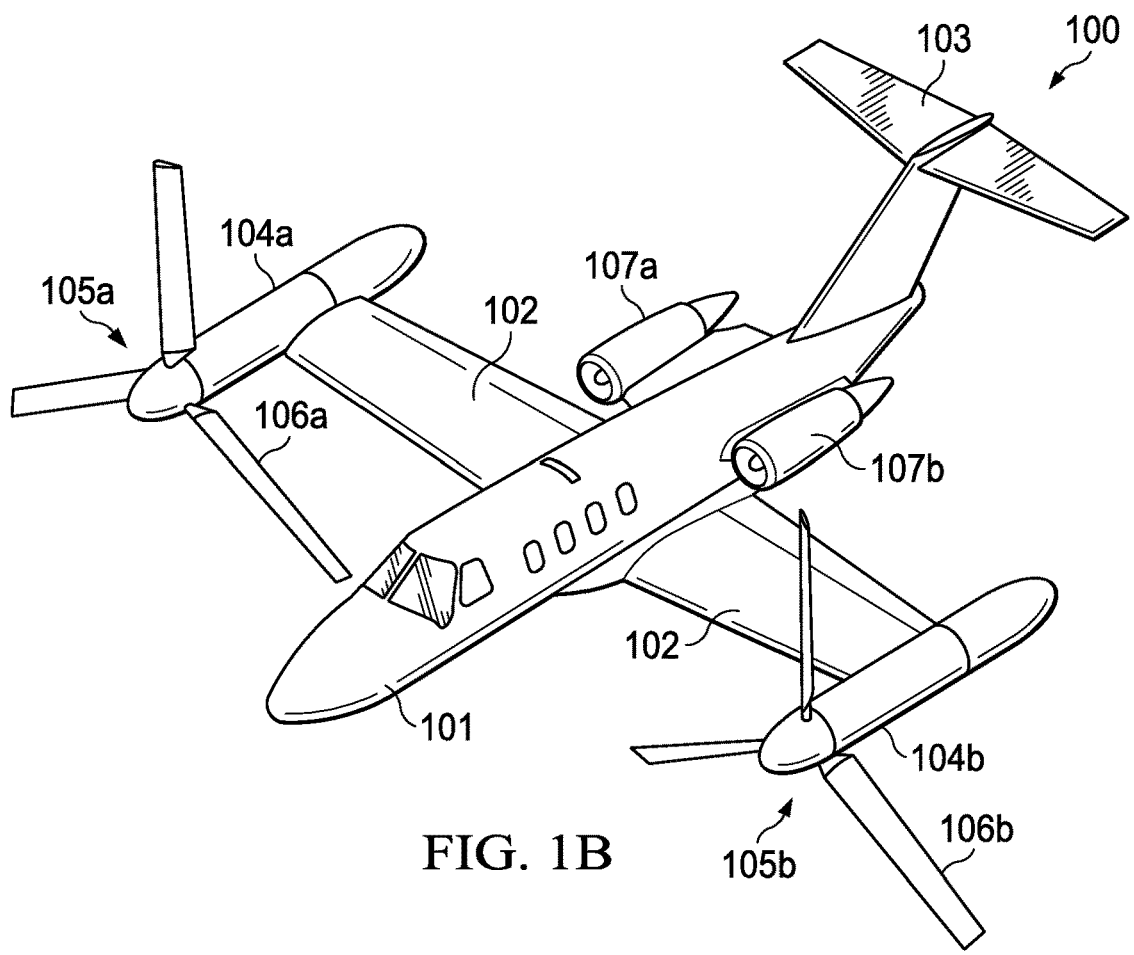
Figure 1C:
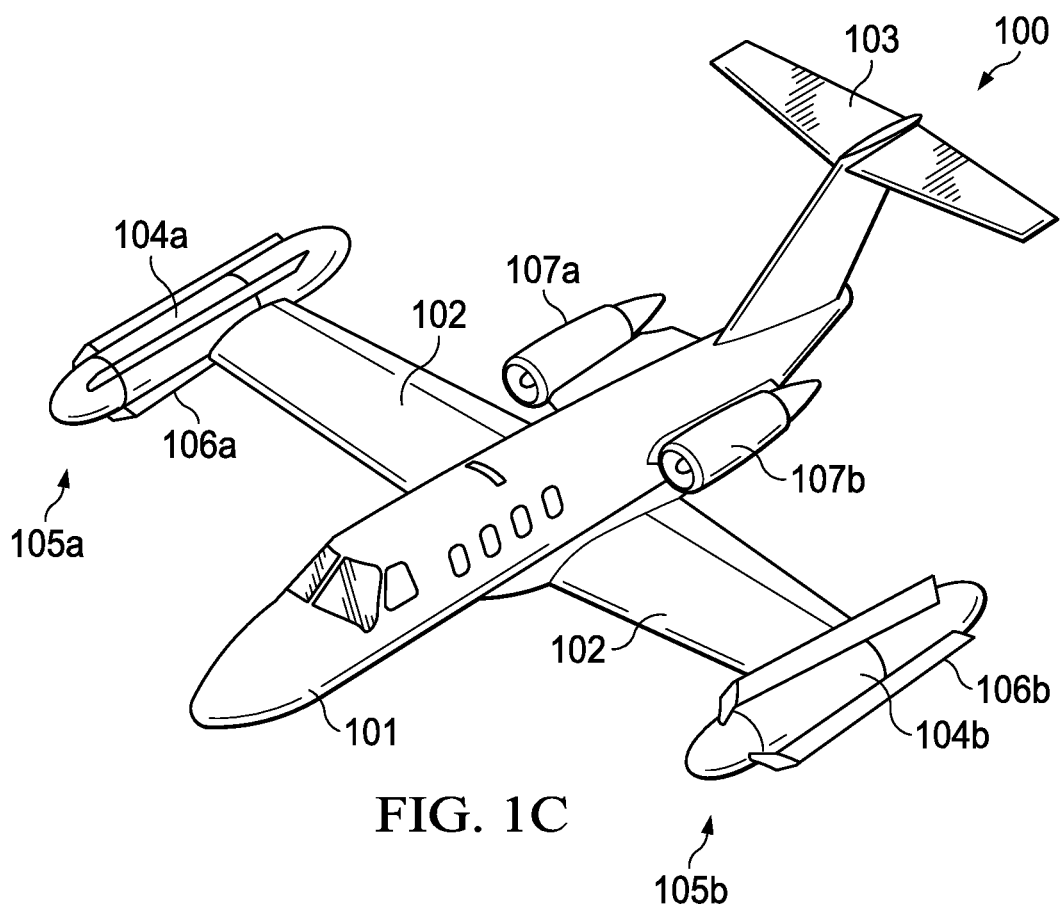

Having thus described the invention in general terms, reference will now be made to the accompanying drawings, which are not necessarily drawn to scale, and wherein:

FIGS. 1A-1C illustrate a tiltrotor aircraft in various flight modes, including helicopter, airplane, and jet/stop-fold modes.

Figure 2:
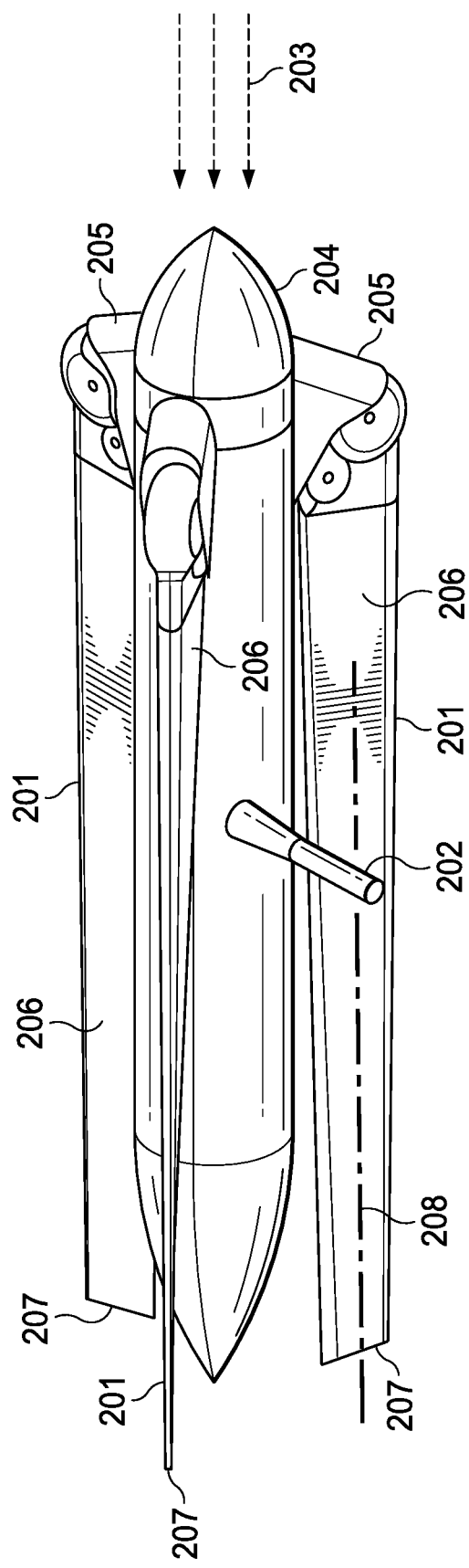

FIG. 2 is a perspective views of a pylon assembly with the rotor blades folded back during high-speed forward flight of a tiltrotor aircraft.

Figure 3A:
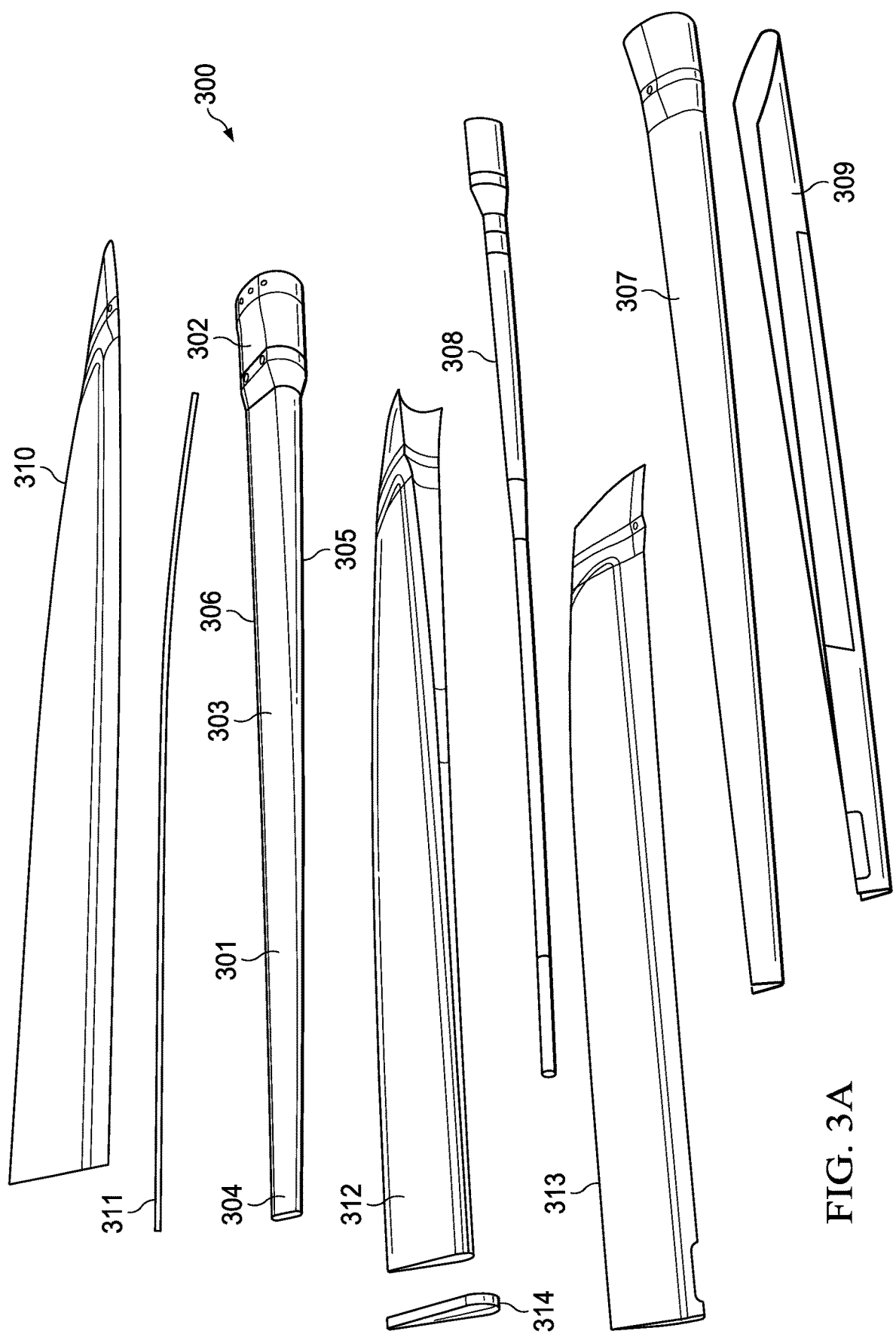
Figure 3B:
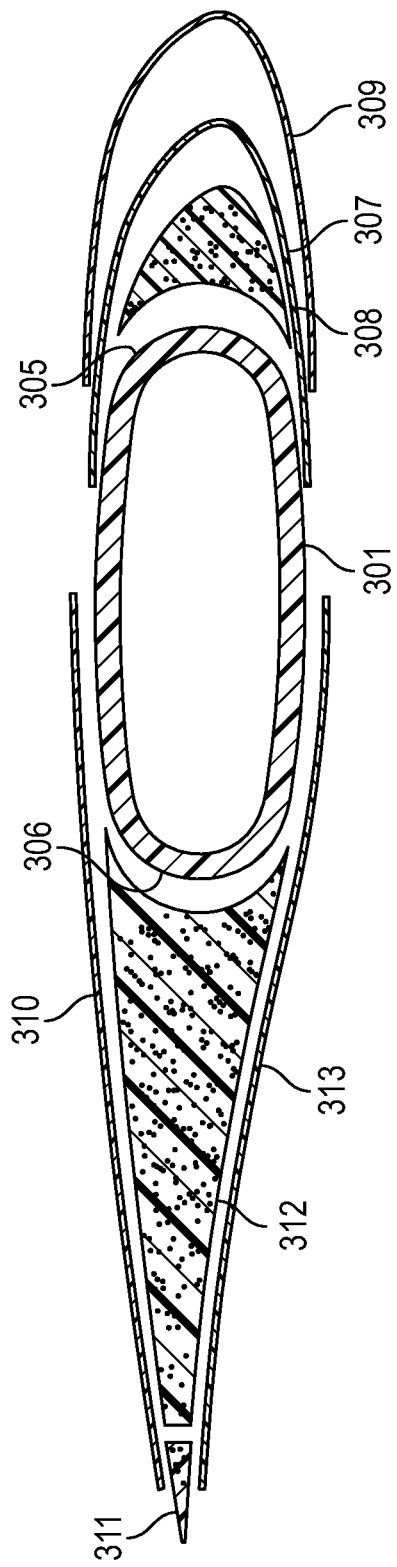
Figure 3C:
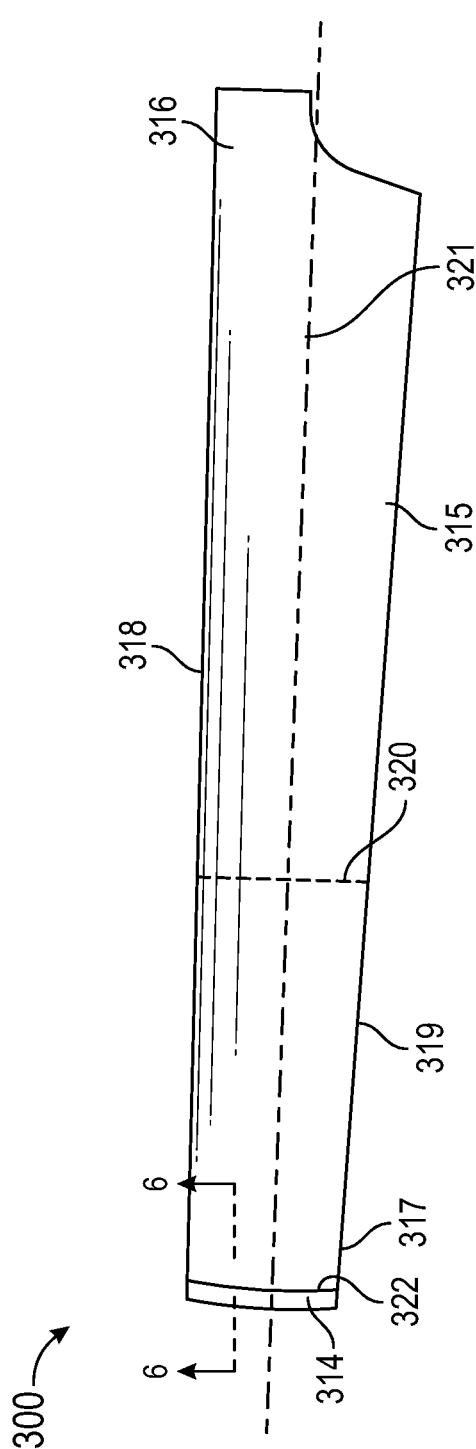

FIGS. 3A-C are views of a rotor blade assembly in accordance with an example embodiment of the present disclosure.

Figure 4:
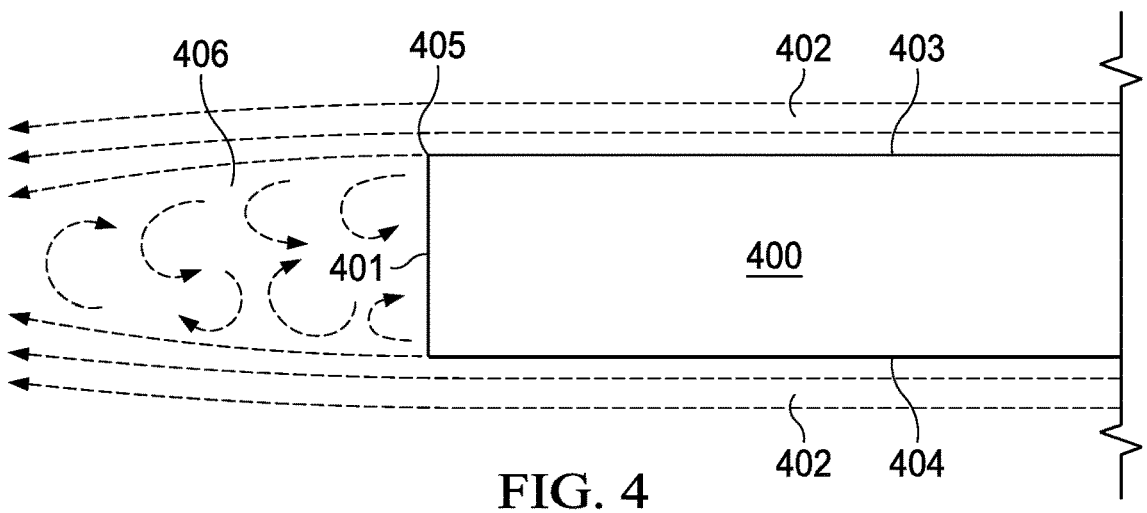
Figure 5:
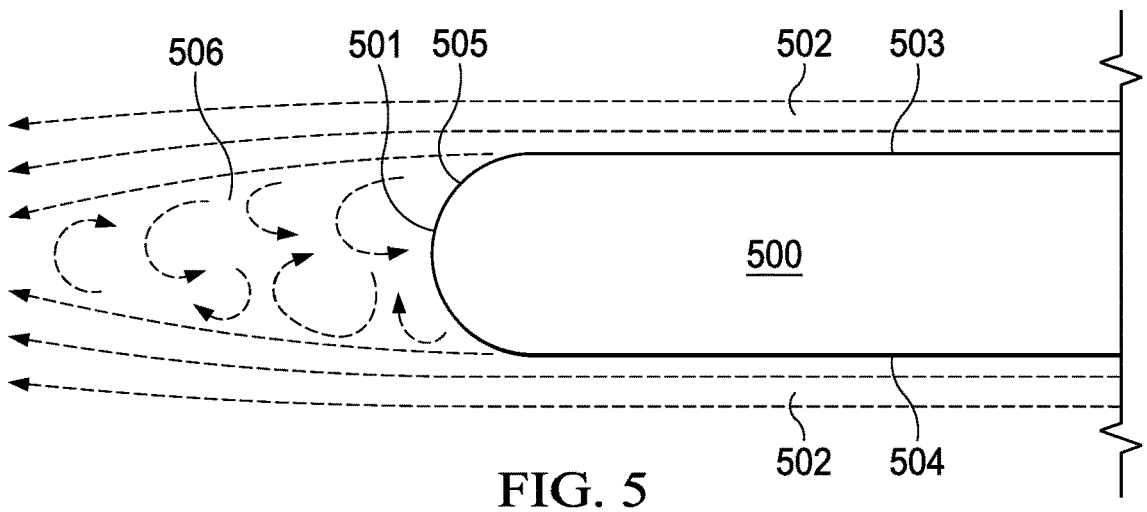

FIGS. 4 and 5 illustrate blade tip shapes found on existing rotor blades.

Figure 6:
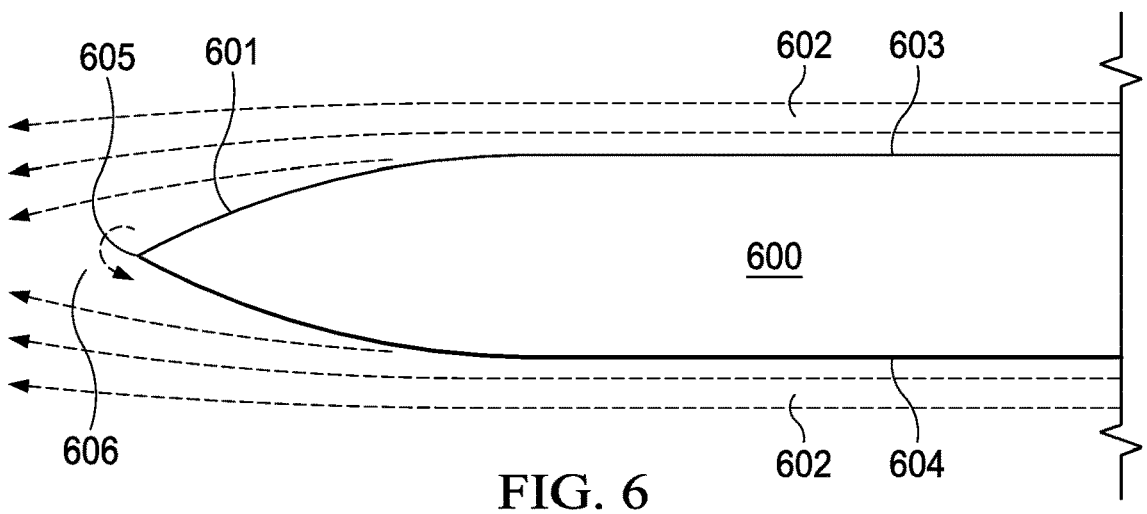

FIG. 6 illustrates a blade tip shape that is optimized for low drag while stowed during jet mode.

Figure 7:
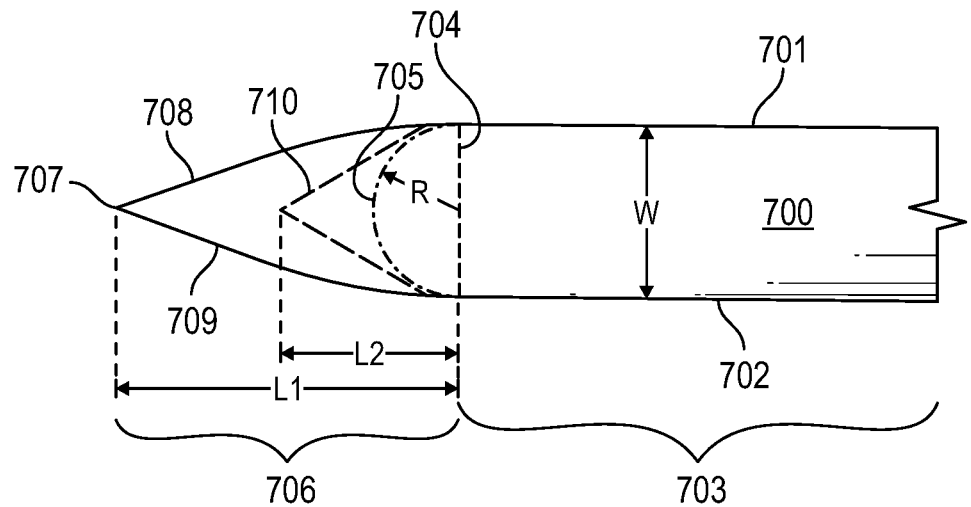

FIG. 7 illustrates a streamlined rotor blade tip according to various embodiments of the invention compared to existing flat and rounded blade tips.

Figure 8:
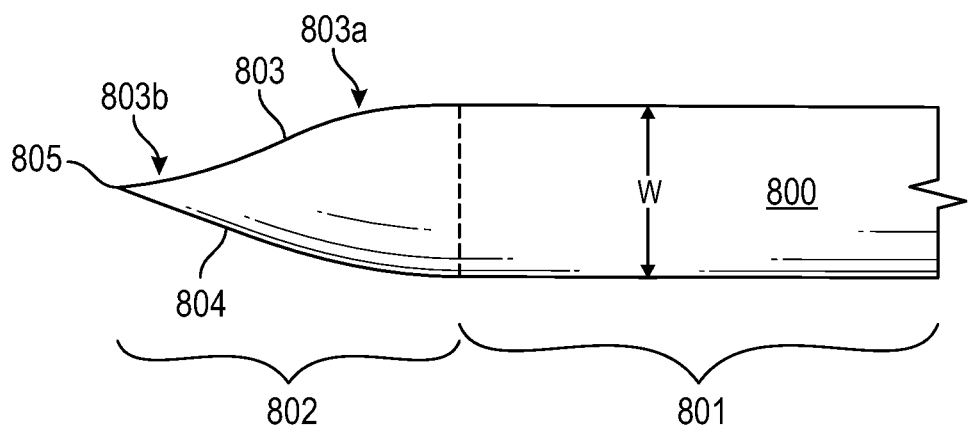
Figure 9:
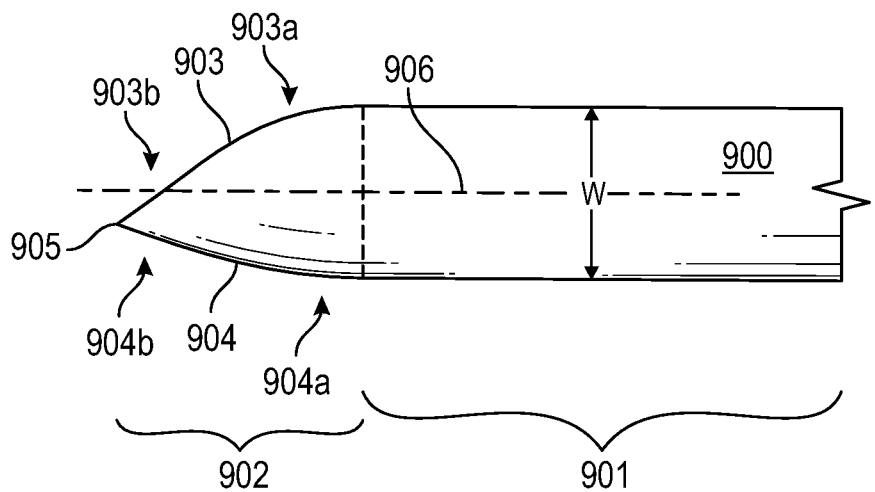

FIGS. 8 and 9 illustrate various embodiment in which a rotor blade has a blade tip with different profiles.

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the present application as defined by the appended claims.

DETAILED DESCRIPTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Referring to FIGS. 1A-1C, a tiltrotor aircraft is schematically illustrated and generally designated 100. Tiltrotor aircraft 100 includes a fuselage 101, wings 102 and tail assembly 103. The wings 102 and tail assembly 103 may include control surfaces, such as ailerons, flaps, slats, spoilers, elevators, rudders, or ruddervators, operable for horizontal and/or vertical stabilization during forward flight. Pylon assemblies 104a, 104b are located at the outboard ends of wing 102 and are rotatable relative to wings 102 between a generally vertical orientation, as best seen in FIG. 1A, and a generally horizontal orientation, as best seen in FIGS. 1B-1C. Pylon assemblies 104a, 104b may comprise a fixed portion that is attached to wing 102 and a moveable portion that rotates or pivots relative to wing 102 as illustrated in FIG. 1A. In other embodiments, the entire pylon assembly 104a, 104b may rotate relative to wing 102.

Pylon assemblies 104a, 104b each house a portion of a drive system that is used to rotate proprotor assemblies 105a, 105b, respectively. The drive system may comprise, for example, a lift engine within fuselage 101 that are coupled to each of the proprotor assemblies 105a, 105b via linkages in wing 102 and pylon assemblies 104a, 104b. Each proprotor assembly 105a, 105b includes a plurality of proprotor blades 106a, 106b that are operable to be rotated, operable to be feathered, and operable to be folded. In other embodiments, pylon assemblies 104a, 104b may comprise engines that are configured to drive respective proprotor assemblies 105a, 105b.

FIG. 1A illustrates tiltrotor aircraft 100 in VTOL or helicopter flight mode, in which pylons 104a, 104b are configured in a vertical position and proprotor blades 106a, 106b rotate in a substantially horizontal plane to provide a lifting thrust, such that tiltrotor aircraft 100 flies much like a conventional helicopter.

FIG. 1B illustrates tiltrotor aircraft 100 in a forward flight mode, in which pylons 104a, 104b have been rotated forward to a horizontal position so that proprotor blades 106a, 106b are rotating in a substantially vertical plane to provide a forward thrust thereby enabling wings 102 to provide a lifting force responsive to forward airspeed, such that tiltrotor aircraft 100 flies much like a conventional propeller driven aircraft.

In the rotary flight modes, proprotor assemblies 105a, 105b rotate in opposite directions to provide torque balancing to tiltrotor aircraft 100. For example, when viewed from the front of tiltrotor aircraft 100 in proprotor forward flight mode (FIG. 1B) or from the top in helicopter mode (FIG. 1A), proprotor assembly 105a may rotate clockwise, for example, and proprotor assembly 105b may rotate counterclockwise. In the illustrated embodiment, proprotor assemblies 105a, 105b each include three proprotor blades 106a, 106b that are equally spaced apart circumferentially at approximately 120-degree intervals. It should be understood by those having ordinary skill in the art, however, that the proprotor assemblies 105a, 105b of the present disclosure may have proprotor blades with other designs and other configurations including, for example, proprotor assemblies having two, four, five or more proprotor blades. In addition, it should be appreciated that tiltrotor aircraft 100 can be operated such that proprotor assemblies 105a, 105b are selectively positioned between proprotor forward flight mode and helicopter mode, which can be referred to as a conversion flight mode.

While in the configuration illustrated in FIG. 1B, tiltrotor aircraft 100 may transition between a proprotor-driven forward-flight mode and a thrust-driven forward-flight mode (referred to herein as "jet mode"). The thrust engine may be, for example, turbojet engines 107a, 107b that are mounted on fuselage 101. The thrust engine may be engaged to initially supplement the forward thrust of proprotor assemblies 105a, 105b. The lift engine may then be disengaged from proprotor assemblies 105a, 105b so that the thrust engines 107a, 107b provide all of the forward thrust for tiltrotor aircraft 100. The proprotor blades 106a, 106b on proprotor assemblies 105a, 105b are then feathered (i.e., oriented to be streamlined in the direction of flight). In the feathered position, the proprotor blades 106a, 106b may act as brakes to aerodynamically stop the rotation of proprotor assemblies 105a, 105b.

FIG. 1C illustrates tiltrotor aircraft 100 in airplane forward flight mode, in which proprotor blades 106a, 106b have been folded so that they are oriented substantially parallel to respective pylon assemblies 104a, 104b. This configuration minimizes the drag force generated by proprotor blades 106b, 106c during jet-mode flight. The forward cruising speed of tiltrotor aircraft 100 can be significantly higher in a thrust-driven airplane flight mode versus proprotor flight mode by reducing any airspeed-induced proprotor aeroelastic instability. In this configuration, the thrust engines 107a, 107b provide forward thrust for tiltrotor aircraft 100, thereby enabling wings 102 to provide a lifting force responsive to the forward airspeed. Apparatus for folding rotor blades on a stop-fold aircraft are disclosed, for example, in U.S. Pat. Nos. 8,998,125 B2, 10,336,447 B2, and 10,526,068 B2, the disclosures of which are hereby incorporated herein by reference in their entirety.

Tiltrotor aircraft 100 may also transition from the folded proprotor blade configuration of FIG. 1C back to proprotor flight by slowing below a maximum airspeed for proprotor deployment. Proprotor blades 106a, 106b may then be swept forward into a feathered configuration. Once all proprotor blades are deployed forward and locked into place (as illustrated in FIG. 1B), then the lift engine may again engage proprotor assemblies 105a, 105b. When torque power is applied to rotate proprotor blades 106a, 106b, tiltrotor aircraft 100 enters proprotor forward-flight mode. Tiltrotor aircraft 100 may then transition to a conversion flight mode and/or helicopter flight mode by rotating proprotor assembly 105a, 105b on pylon assemblies 104a, 104b from a horizontal orientation (FIG. 1B) to a vertical orientation (FIG. 1A).

A flight control computer may be incorporated into tiltrotor aircraft 100 and may be configured to control and communicate with various systems including, for example, proprotor blade control systems in proprotor assembly 105a, 105b. The proprotor blade control systems may be communicably coupled to the flight control computer and may provide closed-loop control of controllable elements located within the proprotor assemblies 105a, 105b. The controllable elements within the proprotor assemblies 105a, 105b may include any structural feature operable to move and/or effect change such as, for example, blade locks, a gimbal lock, trailing-edge flaps, twistable blades, independently controllable elements attached or connected to blades, combinations of the foregoing and/or the like.

The proprotor blade control systems may include, for example, actuators that control motion of the controllable elements in the proprotor assemblies 105a, 105b, sensors that provide feedback data related to the controllable elements, and control computers that operate the actuators, for example, by transmitting control signals to the actuators. The flight control computer and the proprotor blade control systems may collaboratively provide a variety of redundant control methods relative to the controllable elements in the proprotor assemblies 105a, 105b.

Although tiltrotor aircraft 100 has been described as having an internal lift engine and separate external thrust engines 107a, 107b, wherein the lift engine may operate both of the proprotor assemblies in rotary flight mode, it should be understood by those having ordinary skill in the art that other engine arrangements are possible and are considered to be within the scope of the present disclosure. For example, in an alternative embodiment, tiltrotor aircraft 100 may have multiple lift engines that provide torque and rotational energy separately to proprotor assemblies 105a, 105b. In addition, even though proprotor assemblies 105a, 105b are illustrated in the context of tiltrotor aircraft 100, it should be understood by those having ordinary skill in the art that the proprotor assemblies disclosed herein can be implemented on other tiltrotor aircraft having multiple wing members 102 and other proprotor assembly configurations. In other embodiments, the thrust engines 107a, 107b may be located inside fuselage 101 or on wings 102. In further embodiments, the same engine(s) may provide both lifting and thrust power, such as an engine with turboshaft, turbofan, and/or turboprop capabilities.

Accordingly, teachings of certain embodiments recognize the capability to fold rotor blades to reduce aerodynamic forces on the blades during high-speed forward flight. FIG. 1C shows aircraft 100 with blades 106 folded. In this configuration, internal or external jet engines (not shown) may provide thrust during forward flight, and wing 102 may generate lift. In this example, blades 106 in the folded position may result in less drag than when blades 106 are in the extended position as shown in FIGS. 1A and 1B.

Teachings of certain embodiments also recognize that the ability to safely and efficiently fold blades and thereby increase the forward-speed of the aircraft may allow blades to be somewhat flatter (have less blade twist) than, for example, typical tiltrotor blades. For example, conventional tiltrotor blades may operate in two modes: helicopter mode and airplane mode. Some tiltrotor blades 106 may include additional twist to improve performance during airplane mode. Folding blades, however, may not spend much time in airplane mode, and therefore, performance in airplane mode may not be a primary concern. For example, in some embodiments, airplane mode may represent a relatively-short transition period between helicopter mode and high-speed forward flight (e.g., jet mode) when blades 106 are folded. In this example, blades 106 may be designed primarily for helicopter mode, which may allow for somewhat flatter blades with blade tips that are designed to minimize drag when folded.

FIG. 2 is a perspective views of a pylon assembly 200 with rotor blades 201 folded back during high-speed forward flight of a tiltrotor aircraft. In folding mode, pylon assembly 200 converts from tiltrotor airplane mode to high-speed forward flight mode by folding rotor blades 201. Pylon assembly 200 includes a rotor system comprising, for example, a hub, blade grips, swashplate, pitch links, fold cranks, and fold links. These components are used to control the speed and pitch of rotor blades 201 in the extended configuration and to fold and unfold rotor blades 201 for jet mode. Pylon assembly 200 may be mounted at the end of a tiltrotor aircraft wing (not shown) and is coupled to an aircraft engine via drive shaft 202, which runs inside the wing. An example tiltrotor assembly with folding rotor blades is disclosed in U.S. Pat. No. 9,156,545, the disclosure of which is hereby incorporated by reference herein in its entirety.

When operating in the high-speed forward flight mode with rotor blades 201 folded back, the pylon assembly 200 and rotor blades 201 are exposed to airstream 203. Proprotor spinner 204 and aerodynamic fairings 205 reduce the drag created by pylon assembly 200 during jet mode flight. Teachings of certain embodiments also recognize that rotor blades 201 may be somewhat flatter (i.e., have less blade twist) than typical tiltrotor blades in order to improve flight characteristics in the folded configuration and to provide laminar flow of airstream 203 over the surface 206 of folded rotor blades 201. However, the entire rotor blade 201, including blade tip 207, must be taken into consideration when evaluating sources of drag. When rotor blades 201 are operating normally (i.e., spinning to create lift or thrust), the blade tips 207 are generally in line with the airstream as the blade is rotating. Accordingly, existing blade tips 207 are typically optimized either for simplicity of manufacturing or for low drag in rotating operation.

When operating in the stop-fold configuration as shown in FIG. 2, blade tips 207 become the trailing edges of rotor blades 201 and are positioned approximately perpendicular to the airflow, which flows generally parallel to the longitudinal axis 208 of rotor blades 201. Since the rotor blades 201 are not fully faired into the airframe or pylon assembly 200, blade tips 207 are exposed to the air stream and are source for drag if they do not have an aerodynamic shape.

Referring to FIGS. 3A-C, a rotor blade assembly 300 is shown in accordance with embodiments of the present disclosure. FIGS. 3A-B are exploded views showing the components of the rotor blade assembly 300 and FIG. 3C shows the assembled rotor blade 300. Rotor blade assembly 300 includes a spar 301 that is the main structural member of rotor blade assembly 300 designed to carry the primary centrifugal and bending loads of rotor blade assembly 300. Spar 301 has a root section 302, a main section 303, a tip section 304, a leading edge 305 and a trailing edge 306. Spar 301 may have a root-to-tip twist in order to equalize lift distribution along the blade span, which may be on the order of about 30 degrees to about 40 degrees for a typical rotor blade but may be less for a foldable rotor blade. Spar 301 has a generally oval cross section and may be a monolithic structure formed using a woven fabric construction process having a manual or automated layup of a plurality of composite pre-impregnated woven fabric layers, such as fiberglass fabric, carbon fabric, and combinations thereof. After curing, the material layers form a high strength, lightweight solid composite member. In other embodiments, spar 301 can also be made of broad goods tape materials such as graphite or fiberglass and manufactured in a manual or automated fashion.

A discrete sheath 307, an optional foam filler 308, and an abrasion resistant strip 309 form the leading edge of rotor blade assembly 300. As illustrated, sheath 307 has a generally C-shaped cross section and is securely attached spanwise to spar 301 using adhesive, curing or other suitable coupling technique. Sheath 307 is preferably a monolithic structure formed using a broad goods and/or layered tape construction process having a manual or automated layup of a plurality of composite broad goods material layers such as fiberglass fabric, carbon fabric, fiberglass tape, carbon tape and combinations thereof. After curing, the material layers form a high strength, lightweight solid composite member. Sheath 307 serves as a structural member of rotor blade assembly 300 including providing shear stiffness to rotor blade assembly 300. In addition, sheath 307 augments the forward bias of spar 301 to enhance the forward bias of rotor blade assembly 300. As illustrated, foam filler 308 is disposed spanwise between spar 301 and sheath 307. Foam filler 308 is sized and shaped to support sheath 307 at the proper position relative to spar 301. Abrasion resistant strip 309 is disposed spanwise on the leading edge of sheath 307 and is securely attached thereto using adhesive or other suitable coupling technique. Abrasion resistant strip 309 may be formed from a metal such as stainless steel and is designed to protect the other components of rotor blade assembly 300 from erosion and impacts.

Upper skin 310, wedge member 311, core 312 and lower skin 313 form the afterbody of rotor blade assembly 300. Upper skin 319 and lower skin 312 are preferably monolithic structures formed using a broad goods and/or layered tape construction process having a manual or automated layup of a plurality of composite broad goods material layers such as fiberglass fabric, carbon fabric, fiberglass tape, carbon tape and combinations thereof. After curing, the material layers form high strength, lightweight solid composite members. Upper skin 310 and lower skin 313 serve as structural members of rotor blade assembly 300 and are securably attached spanwise to spar 301 using adhesive, curing or other suitable coupling technique. Core 312 may be in the form of a nomex honeycomb structure disposed spanwise along trailing edge 306 of spar 301. Core 312 provides stability, compression resistance and shear transfer between upper skin 310 and lower skin 313. Wedge member 311 forms the trailing edge of rotor blade assembly 300. Wedge member 311 is preferably a monolithic structure formed using a broad goods and/or layered tape construction process having a manual or automated layup of a plurality of composite broad goods material layers such as fiberglass fabric, carbon fabric, fiberglass tape, carbon tape and combinations thereof. After curing, the material layers form a high strength, lightweight solid composite member. Wedge member 311 serves as a structural member of rotor blade assembly 300 including providing stiffness to rotor blade assembly 300.

Blade cap 314 is attached on the tip of rotor blade assembly 300. In some embodiments, blade cap 314 may be a composite material that is formed into a desired shape and bonded to rotor blade assembly 300 by curing with the other components. Alternatively, blade cap 314 may be a machined, stamped, electroformed, or molded from metal or plastic and then attached to completed rotor blade assembly 300. In further embodiments, the rotor blade assembly 300 may not use a separate blade cap 314 but instead the rotor tip shape may be formed from the combined shape and features of upper skin 310, core 312 and lower skin 313, for example.

Referring to FIG. 3C, the assembled rotor blade 300 is shown. A blade span 315 extends between a hub end or inboard end 316 and a tip end or outboard end 322. Rotor blade assembly 300 has a leading edge 318 and a trailing edge 319. During normal rotational operation, air flows across rotor blade assembly 300 from the leading edge 318 to trailing edge 319 and generally parallel to chord 320. However, during jet-mode operation, when rotor blade assembly 300 is folded, air flows across the top and bottom of rotor span 315 from the hub end 316 to the tip end 317 and then across blade cap 314. The jet-mode air flow across blade 300 is generally parallel to blade axis 321.

Blade cap 314 is typically attached to rotor blade assembly 300 in a generally perpendicular orientation relative to the blade's longitudinal axis 321. However, it will be understood that, depending upon the rotor blade design, in some embodiments the blade cap 314 may be attached at an angle to longitudinal axis 321, such as when the tip end 317 has a swept profile from the rotor leading edge 318 to the trailing edge 319.

FIGS. 4 and 5 illustrate blade tip shapes found on existing rotor blades. FIGS. 4 and 5 are cross-section views of the leading edge of a rotor blade. Rotor blade 400 has a flat blade tip 401, which may be employed, for example, due to the simplicity of manufacture, such as a simple saw cut at the end of the rotor blade 400 or allowing the blade assembly components to create this shape. When rotor blade 400 is folded back during jet mode operation, air stream 402 moves in a laminar flow along the sides 403 and 404 of blade 400. Side 403 may correspond to the top or front side when rotor blade 400 is used in the helicopter mode or airplane mode, for example, and side 404 may be the corresponding bottom or back side of rotor blade 400. Due to the abrupt change in form where sides 403 and 404 reach blade tip 401, the air stream 402 separates from rotor blade 400 at point 405, which creates a low pressure area with turbulent air 406. This creates drag at blade tip 401, which acts on the tiltrotor aircraft that is carrying rotor blade 400. The amount of drag is proportional to the square of the velocity of air stream 402 and, therefore, increases as the tiltrotor's airspeed increases.

FIG. 5 illustrates a blade tip shape as found on other existing rotor blades. Rotor blade 500 has a rounded blade tip 501, which may be employed for low drag during rotor blade rotation. The rounded blade tip 501 may provide, for example, a reduced vortex generation off the rotor blade 500 during helicopter mode or airplane mode. When rotor blade 500 is folded back during jet mode operation, air stream 502 moves in a laminar flow along the sides 503 and 504 of blade 500. While the form change is not as abrupt at rounded blade tip 501 as it is on flat blade tip 401 in FIG. 4, blade tip 501 does include a significant form change where sides 503 and 504 end. The air stream 502 separates from rotor blade 500 at point 505, which creates a low pressure area with turbulent air 506. Blade tip 501 has a lower drag coefficient than blade tip 401, but still creates drag on the tiltrotor aircraft that is carrying rotor blade 500.

When operating at high speeds and for long periods of time, all sources of drag on the tiltrotor aircraft are relevant and it is desirable to minimize that drag to increase speed, fuel efficiency, loiter time, and the like. For a stop-fold tiltrotor aircraft, it is possible that 90% of its operation may occur while the rotor blades are in a stowed configuration. Accordingly, neither of the typical blade tip options 401 or 501 is ideal. Because the rotor blade in a stop-fold aircraft spends significant time operating perpendicular to the normal rotor blade orientation, the shape of the blade tip may be modified to minimize drag in the blade-stowed cruise mode.

FIG. 6 is a cross-section view of the tip end of rotor blade assembly 300 in FIG. 3 and illustrates a blade tip shape that is optimized for low drag while stowed during jet mode. Rotor blade 600 has a streamlined blade tip 601, which provides for reduced separation of spanwise air flow 602. The streamlined blade tip 601 has a very smooth form change that is not as abrupt at flat blade tip 401 or rounded blade tip 501. Depending on how far the streamlined shape extends, air stream 602 will separate from rotor blade 600, if at all, at the edge 605, which creates at worst a negligible turbulent region 606. Blade tip 601 has a significantly lower drag coefficient than blade tips 501 and 401 and, therefore, creates little drag on the tiltrotor aircraft that is carrying rotor blade 600.

FIG. 7 illustrates a streamlined rotor blade tip in comparison to existing flat and rounded blade tips. In one embodiment, rotor blade 700 is adapted for use on a tiltrotor aircraft having stop-fold capabilities. Rotor blade 700 is depicted from a perspective looking at the leading edge of the blade along a line parallel to the chord line. Rotor blade 700 has two sides, 701 and 702. Side 701 may correspond to the top or front side when rotor blade 700 is used in a helicopter mode or airplane mode, for example, and side 702 may be the corresponding bottom or back side of the rotor blade. Rotor blade 700 may change thickness over the blade span with a thicker cross section at the hub that gets thinner along the blade span toward the blade end 703. The blade end 703 has a width W, which may be a consistent width over the blade end 703 or an average width over the outer ten to twenty percent of the rotor blade 700.

In the example of FIG. 4, the blade tip 401 corresponds to line 704, wherein the rotor blade abruptly ends in a flat surface. In the example of FIG. 5, the rotor tip 501 corresponds to line 705, wherein the rotor tip has a semi-cylindrical shape having a radius R, where the radius is half of the blade-end width (i.e., R=W/2). Embodiments of the present invention add a streamlined rotor tip 706 to blade end 703. Streamlined rotor tip 706 allows for a smooth laminar air stream (e.g., 602, FIG. 6) across the sides 701 and 702 of rotor blade 700 from the hub all the way to the edge 707 of the blade tip 706. This allows for very minimal to no turbulence at edge 707 while rotor blade 700 is operating in the folded configuration during jet mode flight and therefore reduces or eliminates drag created at the rotor tip in this configuration.

Streamlined blade tip 706 has a first tapered side 708 and a second tapered side 709 that curve inward from rotor blade sides 701 and 702, respectively, to join at edge 707. The length L1 of streamlined blade tip 706 may vary depending upon the taper of sides 708 and 709. At a minimum, the length L of the streamlined blade tip extends beyond the length R of existing rounded blade tip profile 705 (i.e., L>R). For example, streamlined blade tip 706 is approximately four times longer than rounded blade tip 705 (i.e., L1≥4*R). Another example streamlined blade tip 710 is approximately double the length of the standard rounded blade tip (i.e., L1≥2*R). The length of the streamlined blade tip may also be measured relative to the width W of blade end 703, wherein the streamlined blade tip is longer than half the width of the blade end 703.

The slope and shape of the curve formed by sides 708 and 709 may vary, for example, depending upon the width W of rotor blade 700 and the length L of streamlined rotor tip 706. In some embodiments, the tapered sides 708 and 709 may have a convex profile all the way to peak 700 as illustrated in FIG. 7. It will be understood that edge 707 may have a sharp edge, such as a very acute angle where tapered sides 708 and 709 connect, or may be blunted, such as having a rounded edge.

FIG. 8 illustrates an embodiment in which rotor blade 800 has a blade tip with another profile. Blade end 801 of blade 800 is attached to blade tip 802. The first tapered side 803 and second tapered side 804 of blade tip 802 have different profiles. Side 803 starts with a convex profile 803a at blade end 801 that transitions to a concave profile 803b before meeting side 804 at edge 805. Side 804 has an overall convex profile.

FIG. 9 illustrates an embodiment in which rotor blade 900 has a blade tip with another variation in its profile. Blade end 901 of blade 900 is attached to blade tip 902. The first tapered side 903 and second tapered side 904 of blade tip 902 have similar profiles but meet at offset edge 905, which is offset from the centerline 906 of rotor blade 900. The centerline 906 may be a geometric or aerodynamic centerline and may apply to the entire rotor blade 900 or just the tip end. Side 903 starts with a convex profile 903a at blade end 901 that transitions to a flat profile 903b before meeting side 904 at edge 905. Similarly, side 904 starts with a convex profile 904a at blade end 901 that transitions to a flat profile 904b.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A proprotor assembly comprising:
   at least one rotor blade that is selectively movable from an extended position to a folded position, the rotor blade configured external to an airframe when in the folded position, the at least one rotor blade comprising:
   a blade span extending between a hub end and a tip end of the blade span, the blade span having a specified thickness at the tip end; and
   a blade tip attached to the tip end of the blade span, the blade tip having at least two sides that are tapered together to an edge, wherein a length of the blade tip from the tip end to the edge is a distance that is greater than half the thickness of the tip end, wherein the blade tip has a first side corresponding to the first side of the blade span, and a second side corresponding to the second side of the blade span, and wherein the first side and the second side of the blade tip have convex profiles.

2. The rotor blade of claim 1, wherein the length of the blade tip is a distance that is at least equal to the thickness of the tip end.

3. The rotor blade of claim 1, wherein the first side and the second side of the blade tip have, near the tip end of the blade span, convex profiles that transition into flat profiles near the edge.

4. The rotor blade of claim 1, wherein at least one of the first side and the second side of the blade tip have, near the tip end of the blade span, a convex profile that transitions into a concave profile near the edge.

5. The rotor blade of claim 1, wherein the edge is offset from a centerline of the blade span.

6. The rotor blade of claim 1, wherein when the rotor blade is operating in a folded configuration, air flows over the first side and the second side in a direction generally parallel to a longitudinal axis of the rotor blade.

7. A tiltrotor aircraft, comprising:
   a rotor system comprising at least one rotor blade that is selectively movable from an extended position to a folded position, the at least one rotor blade having an outboard end, the rotor blade configured external to an airframe when in the folded position; and
   a blade tip attached to the outboard end of the rotor blade, the blade tip having at least two sides that are tapered together to an edge, wherein a length of the blade tip from the outboard end to the edge is a distance that is greater than half the thickness of the outboard end, wherein the blade tip has a first side corresponding to a first side of the rotor blade, and a second side corresponding to the second side of the rotor blade, and wherein the first side and the second side of the blade tip have convex profiles.

8. The tiltrotor aircraft of claim 7, wherein the length of the blade tip is a distance that is at least equal to the thickness of the outboard end.

9. The tiltrotor aircraft of claim 7, wherein the first side and the second side of the blade tip have convex profiles near the outboard end that transition into flat profiles near the edge.

10. The tiltrotor aircraft of claim 7, wherein at least one of the first side and the second side of the blade tip have a convex profile near the outboard end that transitions into a concave profile near the edge.

11. The tiltrotor aircraft of claim 7, wherein the edge is offset from a centerline of the rotor blade.

12. The tiltrotor aircraft of claim 7, wherein the first side and the second side have profiles that are configured to promote a laminar air flow from the outboard end to the edge when the rotor blade is in the folded position.

13. The tiltrotor aircraft of claim 7, wherein when the rotor blade is operating in a folded configuration, air flows over the first side and the second side in a direction generally parallel to a longitudinal axis of the rotor blade.

14. A tiltrotor aircraft, comprising:
   a fuselage;
   a wing attached to the fuselage;
   a rotor system coupled to the wing and configured to move between a horizontal position and a vertical position during operation, the rotor system comprising two or more rotor blades operable to generate thrust when rotating and configured to move between an extended position and folded position, the rotor blade configured external to an airframe when in the folded position; and
   blade tips attached to an outboard end of the rotor blades, the blade tips having two sides that taper together to an edge, wherein a length of the blade tip from the outboard end to the edge is a distance that is greater than half the thickness of the outboard end, wherein the blade tips each have a first side corresponding to a first side of each the rotor blades, and a second side corresponding to the second side of the rotor blade, and wherein the first side and the second side of the blade tips have convex profiles.

15. The tiltrotor aircraft of claim 14, wherein when the rotor blades are operating in a folded position, air flows over the first side and the second side in a direction generally parallel to a longitudinal axis of each rotor blade.

* * * * *